United States Patent [19]

Lusignan et al.

[11] Patent Number: 4,843,356

[45] Date of Patent: Jun. 27, 1989

[54] ELECTRICAL CABLE HAVING IMPROVED SIGNAL TRANSMISSION CHARACTERISTICS

[75] Inventors: Bruce B. Lusignan; Simos D. Dadakarides, both of Stanford, Calif.

[73] Assignee: Stanford University, Stanford, Calif.

[21] Appl. No.: 899,714

[22] Filed: Aug. 25, 1986

[51] Int. Cl.⁴ .............................................. H01P 3/02
[52] U.S. Cl. ...................... 333/236; 333/12; 333/243; 333/238; 174/36; 174/105 R; 174/106 R
[58] Field of Search ............... 333/238, 1, 12, 243, 333/236, 202, 206; 174/28, 32, 36, 105 R, 106 R, 109, 35 MS, 35 R

[56] References Cited

U.S. PATENT DOCUMENTS

| | | | |
|---|---|---|---|
| 2,787,656 | 4/1957 | Raisbeck | 333/243 X |
| 3,082,387 | 3/1963 | Monelli et al. | 333/243 X |
| 3,683,309 | 8/1972 | Hirose | 333/12 X |
| 3,688,224 | 8/1972 | Suetake et al. | 333/206 |
| 4,017,344 | 4/1977 | Lorber et al. | 174/28 X |
| 4,301,428 | 11/1981 | Mayer | 333/12 |
| 4,347,487 | 8/1982 | Martin | 333/1 |
| 4,383,225 | 5/1983 | Mayer | 333/12 |
| 4,399,419 | 8/1983 | Dobrovolny | 333/12 |
| 4,486,721 | 12/1984 | Cornelius et al. | 333/12 X |
| 4,510,468 | 4/1985 | Mayer | 333/12 |
| 4,539,433 | 9/1985 | Ishino et al. | 174/36 X |

OTHER PUBLICATIONS

Raychem, "Electroloss", 1983.
King, "An Experimental Clogston 2 Transmission Line", Bell Sys. Tech. Journal, vol. 38, No. 2, Mar. 1959, pp. 517–537.
Andersen et al., "Losses in Dielectrically Loaded Coaxial Cables", Proc. IEE, vol. 116, No. 10, Oct. 1969, pp. 1665–1672.
Lewis et al., "Characteristics of Dielectric-Tube-Loaded Coaxial Cables", Proc. IEE, vol. 119, No. 5, May 1972, pp. 523–528.
Chambers et al., "Attenuation Characteristics... Transmission Lines", Proc. IEE, vol. 117, No. 5, May 1970, pp. 897–902.
Clogston, "Reduction of Skin Effect . . . Laminated Conductor", Bell System Tech. Journal, vol. 30, No. 3, Jul. 1951, pp. 491–528.

Primary Examiner—Eugene R. LaRoche
Assistant Examiner—Seung Ham
Attorney, Agent, or Firm—Flehr, Hohbach, Test, Albritton & Herbert

[57] ABSTRACT

An electrical transmission line has improved signal transmission characteristics, low attenuation, constant phase and group velocity and constant and nearly ohmic characteristic impedance over a wide frequency band by providing low magnetic loss inductance along with the shunt capacitance of the insulation surrounding the conductors. The low loss inductance can be provided by particulate magnetic material, such as ferrites, homogeneously distributed in the insulating material or alternatively the inductance can be provided by ring(s) of magnetic material concentric with the conductor or by layer(s) of magnetic material when the conductor(s) are flat. A variety of radial or longitudinal profiles of the doping level is possible and can be used in combination with any of these basic loading designs. These concepts can be applied in twisted pair, coaxial or high voltage power transmission and distribution single or three phase cables or strip lines and other breadboard applications. A set of additional designs which incorporate the magnetic loading in the conductor occupied region is also proposed, with one application being the high voltage or large size cables. The so designed twisted pairs have performance comparable to existing coaxial cables. All lines have superior performance than the conventional ones at virtually the same cost. Magnetic loading of existing cables and overhead lines is also disclosed.

3 Claims, 3 Drawing Sheets

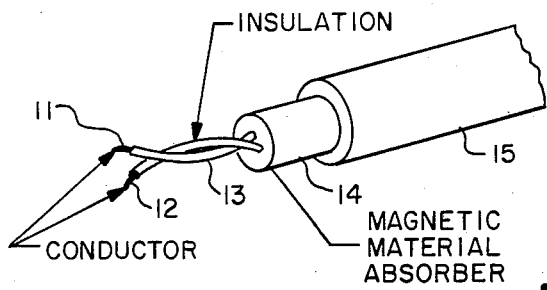
PRIOR ART
FIG.—1
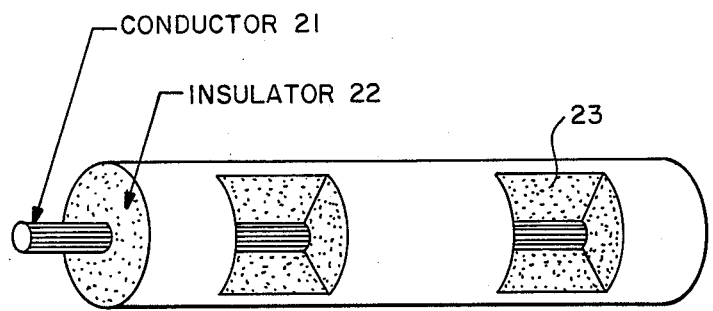 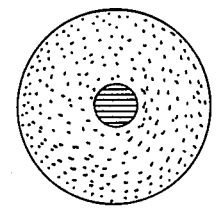
FIG.—2A  FIG.—2B
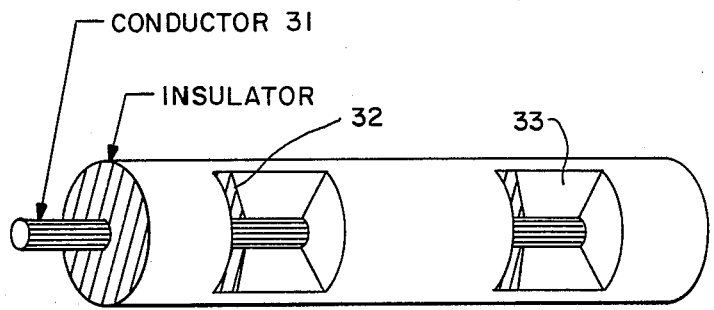 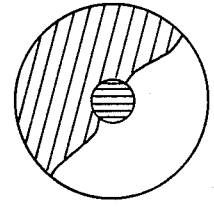
FIG.—3A  FIG.—3B

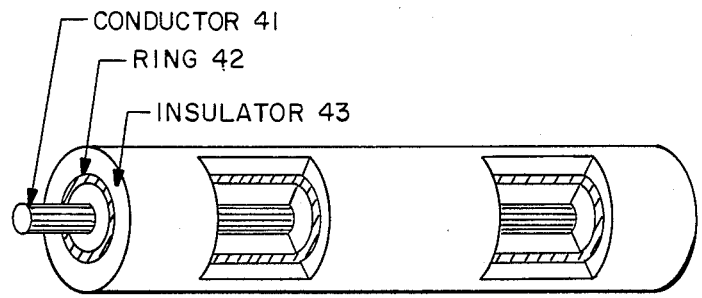
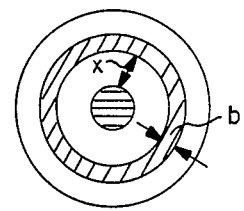
FIG.—4A  FIG.—4B
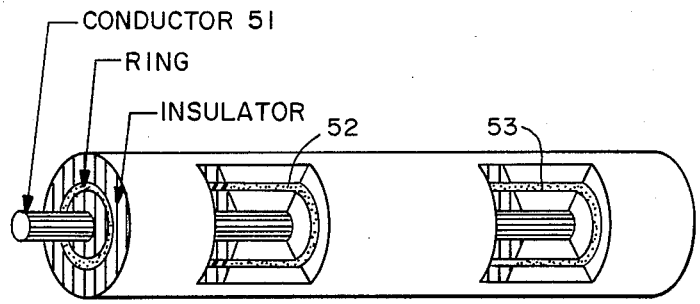
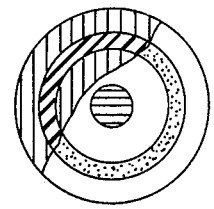
FIG.—5A  FIG.—5B
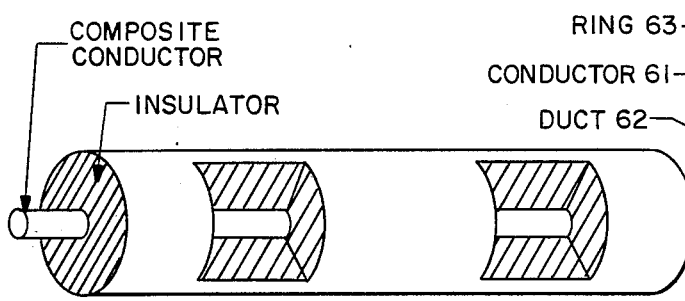
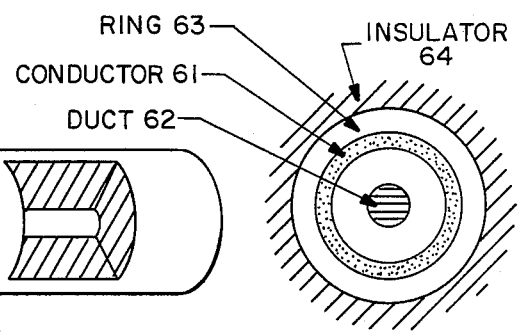
FIG.—6A  FIG.—6B
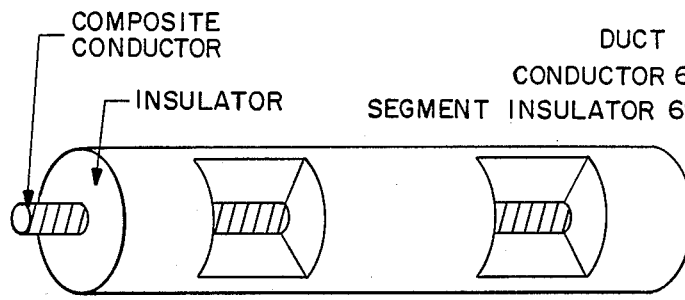
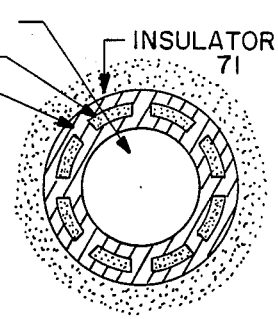
FIG.—7A  FIG.—7B

ELECTRICAL CABLE HAVING IMPROVED SIGNAL TRANSMISSION CHARACTERISTICS

This invention relates generally to electric cables, and more particularly the invention relates to signal transmission cables such as twisted pair, coaxial, high voltage power lines, and strip lines having improved transmission characteristics.

Much of the loss associated with any cable is attributable to the shunt capacitance of the cable. The present invention is directed to minimizing this loss by adding an inductance to compensate the shunt capacitance. Heretofore, lossy ferrite material has been incorporated in a cable structure as a shield, surrounding an insulated twisted pair in order to attenuate external high frequency signals which can interfere with the signal transmitted by the cable. See for example U.S. Pat. Nos. 3,191,132; 4,383,225; and 4,506,235. This lossy ferrite shield is put in a way so it does not alter the transmitted signal. If it does the effect is deleterious for it. In accordance with the invention, low loss magnetic material is added to the electrical insulation of the cable, in close proximity with the conductor(s) using certain designs as described later, to form an LC distributed circuit with the shunt capacitance associated with the insulation and thereby minimize the loss. Since the inductance and capacitance are not ideal, loss is associated therewith. However, use of low loss magnetic material reduces the effective resistance losses associated with the LC circuit. At low frequencies the LC effect is not very strong and the effective resistance of the cable is nearly equal to the DC resistance of the conductor. At higher frequencies, the conductor resistance increases with the incremental increase depending on the square root of frequency due to the skin effect which dominates, while the magnetic losses increase as a linear function of frequency but still remain low. The LC effect increases as the frequency squared keeping the transmission losses low. Only at very high frequencies do the magnetic losses, due to the inherent bulk magnetic material behavior, become high enough to counterbalance the desired LC effect and increase the transmission losses sharply.

Accordingly, an object of the invention is an electric cable having improved signal transmission characteristics.

Another object of the invention is an improved twisted pair cable for use in wide band lines.

Another object of the invention is an improved performance coaxial cable.

Another object of the invention is an improved performance high voltage power transmission line.

Another object of the invention is an improved performance strip line or set of strip lines.

A feature of the invention is the introduction of a low loss inductance along with the shunt capacitance of an insulated electrical cable.

The invention and objects and features thereof will be more readily apparent from the following detailed description and appended claims when taken with the drawings, in which:

FIG. 1 is a perspective view of an electrical cable in accordance with the prior art.

FIG. 2A is a perspective view of one cable, which may be one-half of a two-wire or twisted pair or a coaxial stripped of the outer conductor electrical cable in accordance with one embodiment of the present invention, and FIG. 2B is a cross sectional view.

FIGS. 3, 4 and 5 are views of other embodiments of an electrical cable in accordance with the invention.

FIGS. 6 and 7 are views of power cables in accordance with the invention.

Figure 8:
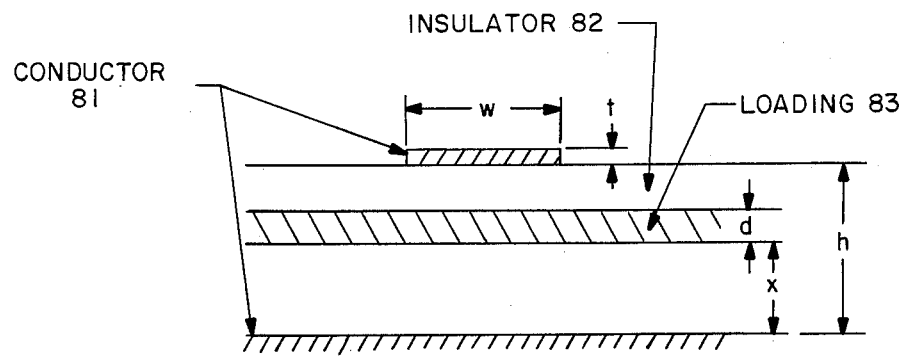
Figure 9:
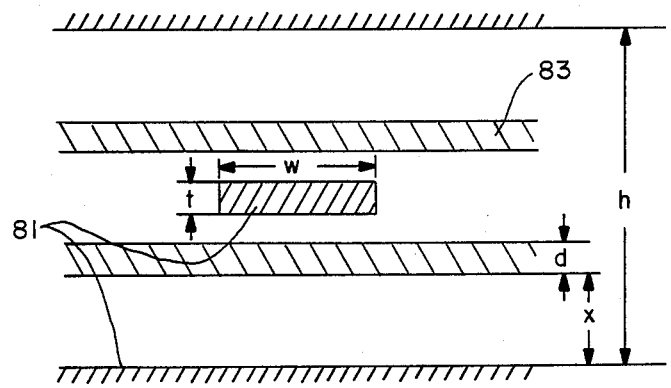
Figure 10:
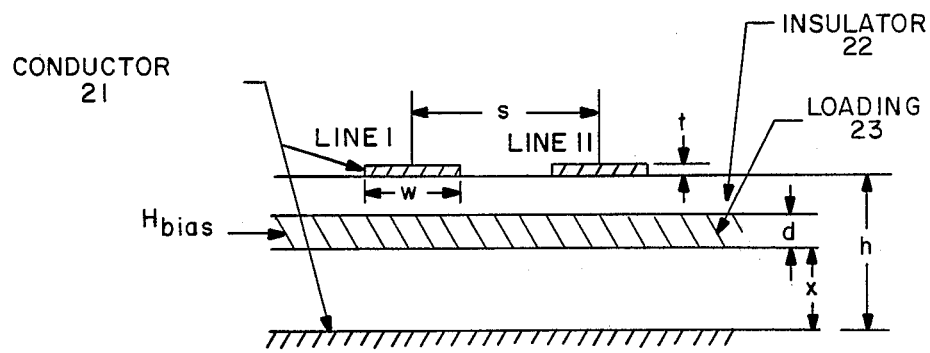

FIGS. 8, 9, and 10 are views of strip lines in accordance with the invention.

Referring now to the drawings, FIG. 1 is a perspective view of an electrical cable in accordance with the prior art as disclosed in U.S. Pat. No. 4,506,235. A twisted pair cable comprising two conductors 11, 12 each covered with an insulation 13 is imbedded within a flexible absorptive composition 14 comprising ferrite particles in an amount from 85-94% by weight. The resulting lossy composite 14 is highly absorptive of external electrical signals and thereby provides a magnetic shielding effect against outside electromagnetic interference. Since the magnetic particles are not placed in the insulation 13 in close proximity to the conductors 11, 12, deleterious effects on signals transmitted on cables 11-12 is minimized while providing the protection against electromagnetic interferences.

FIG. 2 is a perspective view of a Uniformly Doped Insulator (UDI) electric cable (only one insulated and magnetically loaded conductor is shown) in accordance with one embodiment of the present invention. In this embodiment the electrical conductor 21 is coated with an insulation 22 in which fine particles of magnetic material are uniformly disbursed as shown at 23.

Trace amount of ferrite is not sufficient to form a reactive LC circuit with the shunt capacitance of the insulation because the inductive effect drops sharply as the magnetic particle concentration in the insulation drops. High concentration may result in increased capacitance also so that the low losses of the magnetic material are counterbalanced. This design is attractive only if low dielectric permitivity magnetic non-metallic dopants like these ferrites are available. The UDI design is promising, depending on the permeability of the magnetic material used.

FIG. 3 is a perspective view of a Discretely Doped Insulation (DDI) embodiment of a cable showing a single conductor 31, and the discretely doped insulation along the cable axis. The insulation is comprised of alternating sections of relatively high concentration of magnetic substance 32 and undoped or low concentration sections 33.

The highly doped areas supply the necessary inductance along with a, possibly, higher capacitance if the magnetic material has high dielectric constant while the low concentration areas behave as standard insulation. The shape, the periodicity, and the profile of the concentration along the cable axis affect the LC characteristics of it and, subsequently, the transmission features.

This discrete doping provides semidistributed loading or lumped mini-inductances and mini-capacitances. The cable will act as a low pass filter and will have a cut-off frequency due to this semi-lumped configuration which for low-loss cases and for a cable having length 1 is given by:

$$f_{3dB}(1) = f_o(x + [x^2 + 5(n)]^{\frac{1}{2}})^{\frac{1}{2}}$$

where: $f_o = \dfrac{1}{2\pi[(L_{distr} \cdot T_z + L_{lump})(C_{distr} \cdot T_z + C_{lump})]^{\frac{1}{2}}}$ $$f_L = \frac{1}{2\pi(R + B) \cdot T_z \cdot (C_{distr} \cdot T_z + C_{lump})}$$

$$x = 1 - \frac{1}{2}\left(\frac{f_0}{f_1}\right)^2$$

$$s(n) = (2^{1/n} - 1) = (2^{T_z/1} - 1)$$

Subscripts "distr", "lump" stand for distributed and lumped elements respectively, with L expressing series inductance and C shunt capacitance. $T_z$ is a suitably chosen periodicity of the longitudinal magnetic loading profile, measured in ($1$/Length) units.

It is apparent that the closer the mini-elements are the higher the cut-off frequency will be. However, this cutoff frequency can be easily set to be much higher than the frequency at which the bulk magnetic material itself starts to have high losses and the advantage of the inductive loading effect is neutralized. The DDI design offers advantages and promises low attenuation without significant cost increase.

FIG. 4 is a perspective of a Ringed Insulation (RGI) embodiment. It employs ring(s) 42 concentric with the conductor 41 at different position(s) "x" and of different thickness "L" according to the required electromagnetic characteristics. The transmission line characteristics depend weakly on ring(s) position(s) and this suggests that, for manufacturing easiness, the preferred locations may be either in contact with the conductor or at the outermost position. It is worth mentioning that ferrites are highly resistant to water or sea water and are attacked only by strong acids. It offers high inductance while suppressing the capacitance and has no cut-off frequency except that which is dictated by the bulk-magnetic substance sharp loss increase. The doped ring has a high concentration of magnetic substance in order to offer high inductive loading. The rest of the insulation comprises regular insulator 43. It is a very promising design, offering low attenuation with only small cost increase.

FIG. 5 is a perspective view of a combined DDI+RGI embodiment. Here, ring(s) concentric with the conductor 51 have a discrete doping along the cable axis with high 52 and low (if any) doping 53. It is a hybrid design, and as such it has behavior in between the RGI and DDI. There are more independent parameters (ring and discrete doping parameters) to play with and offers great flexibility. It has a cut-off frequency given by fco.

The designs of FIGS. 3, 4 and 5 avoid the disadvantage of possibly higher capacitance of the embodiment of FIG. 2 (UDI) at the price of a slight cost increase. FIGS. 3, 4 and 5 show only a single insulated conductor; however, a twisted pair is made up of two such conductors, the coaxial of one covered by the outer conductor.

In all disclosed designs the magnetic material is chosen for low losses. In an embodiment for operating at frequencies less than about one MHz, particles of Manganese-Zinc ferrite comprising a non-negligible part of the total insulating volume is employed. When the cable is carrying signals at higher frequencies the magnetic material is preferably a ferrite such as Nickel-Zinc of similar percentage by volume of the insulation material.

Combinations of these magnetic substances are also possible Further, different doping designs are possible if they offer the same advantages and lower cost or manufacturing easiness or any other additional advantage. The improved designs DDI, RGI and DDI+RGI result in high performance cables even with a few percent per insulation volume low loss insulation magnetic material. Other magnetic materials can be used if they have low losses and substantial permeability to offer net improvement of the transmission characteristics. However, metals and metallic alloys do not seem attractive because of their high ohmic losses.

TWISTED PAIR OR ANY TWO CONDUCTOR CABLES

Coaxial electrical cables for transmitting high frequency electrical signals provide lower attenuation as compared to the twisted pair or parallel electrical conductor cable. However, the twisted pair cable is normally used in many applications because of cost considerations.

Besides low attenuation over a wide frequency band, the magnetically load cables in accordance with the invention tend to have constant and nearly ohmic characteristic impedance that solves many impedance matching problems and lowers terminal complexity and cost. Electromagnetic field is better confined and this reduces cross-talk and radiation losses.

Phase and group velocity variation is very small and phase distortion very low, which implies decreased bit error rate for digital transmission systems.

The invention has proved to be particularly advantageous in a twisted pair or any two conductor cable for use in wide band applications. However, the invention is applicable in other cables and many applications such as the following:

Coaxial Cables—The same principle and the same magnetic loading designs can be used in coaxial cables. Since coaxials are used in higher frequencies than twisted pairs, the only limitation to improvement of their transmission characteristics is the behavior of ferrites at high frequencies.

Most of them have low permeability and increased losses at frequencies that reach the 10–100 MHz band. In most of the cases magnetic losses dominate, and this means that the ohmic resistance of the conductors, which at high frequencies is inversely proportional to the cable diameter, is not the primary contributor to signal attenuation.

Since magnetic losses dominate, the cable size can be reduced with no profound effect on the attenuation. In light of the increased magnetic losses at very high frequencies the primary trend might be the cable size reduction with no attenuation increase rather than the bandwidth increase for the same cable size.

All other properties, such as characteristic impedance and phase and group velocity change in a similar fashion as in twisted pairs.

Magnetic loading is more likely to be provided by Nickel-Zinc ferrites which have better characteristics than Manganese-Zinc ferrites at high frequencies.

Power Cables—Another set of applications are cables for transmission and distribution of power. The principle and designs can be used in all transmission voltages and for power ratings that the ferrite materials behave linearly. Both single phase and three phase circuits can use such magnetically loaded cables.

Magnetic loading can be employed for all types of cable insulation including impregnated paper, extruded and gas. Potentially, already operating systems can be upgraded by inserting ferrite rings in the coolant ducts or in between the cores of three phase circuits or by using magnetic liquids for cooling.

Overhead lines can also be wrapped by magnetic tape or surrounded by thin magnetic rings.

The major part of losses in conventional cables comes from the effective resistance of the cable. Magnetic loading reduces the significance of this resistance, and this implies that smaller cables can be used or that the same size cables will have significantly lower losses. Considering that fuel cost for power generation dominated over cable cost, it seems more likely that standard size cables with magnetic loading will have major economic advantages.

All the insulation loading designs presented in the previous section can be used in power cables also.

For three phase circuits phase inductance is decreased by an amount equal to one half of the sum of the mutual inductances between the considered phase and the other two.

An additional family of designs is proposed which overcomes this problem by enhancing only the self-inductance of the phase. This is called the "CCC", for composite-conductor cable, design.

A sandwiched ring (SW—RG) composite-conductor shown in FIGS. 6A and 6B consists of two conducting sections, the outer being of annular shape 61 and the inner either annular or solid 62. Underneath the outer conductor is a thin ferrite ring 63 which provides the high inductance. Insulation 64 surrounds the outer conductor. Both sections carry the same phase current, each carrying part of it, and they are kept short circuited to avoid voltage buildup across the magnetic ring.

Self-inductance is maximized when the cross sectional areas of the two conducting sections are the same. However, depending on the saturation properties of the magnetic material, it may be that in order to avoid magnetic saturation the inner conductor shall carry a smaller portion of the phase current.

In another power cable called Insulated-Loaded Segment (IL—SGM) and shown in FIGS. 7A and 7B, the composite-conductor consists of insulated and magnetically loaded wires 68 instead of bare wire segments. Segment insulators 69 surround wires 68 and duct 70.

One advantage of the CCC design is that the insulated segments may be regular cables that can be manufactured by any cable plant and just assembled by power cable manufacturers.

Thermal considerations may suggest that the insulation of the individual segments shall consist mainly of ferrite material because it has high thermal conductivity and heat transfer capability.

Composite conductor insulation 71 may have any form that standard conductor cable insulation has, magnetically loaded or not.

Magnetic loading may be provided by means of a ring (belt) surrounding all phases of three phase cables, but the effective inductance provided to each phase will be lower than that provided by other designs. Manganese-Zinc ferrites can be used because they have high permeability at low frequencies. However, Nickel-Zinc ferrites are also attractive because they have extremely low conductivity and associated eddy losses. Thus, power cables using magnetically loaded insulation or belt or composite-conductors or any other form of magnetic loading with low loss magnetic materials will have lower losses than standard cables used in the transmission and distribution of power.

Magnetic loading offers an additional independent parameter in the cable design. Cable dimensions or operating conditions can change without loss increase, or loss can be lowered for certain combinations of the design parameters. The inductive loading offers distributed reactive compensation of the cable capacitance. The virtual elimination of the travelling reactive power lowers the line current while the load current remains the same. Inversely, if the line current is kept at the same level, the magnetically loaded cable will deliver more power to the load at the same operating voltage than the standard cable.

The distributed reactive compensation eliminates the need for shunt inductors, a feature that is very attractive for many systems and especially the underwater ones.

An interesting implication of the magnetically loaded cable is the use of higher frequencies for power transmission and distribution or even frequency division multiplexing for power transmission.

The technique can be applied to any cable, single phase or three phase as far as the operating power level is below that where the magnetic loading starts to behave non-linearly.

Strip Lines—Magnetic loading of the substrate dielectric of strip lines and the similar by means of doped or layered insulator is another application of the concept of inductive loading of transmission lines with low loss magnetic materials.

Nickel-Zinc ferrites are among the candidates because they have extremely low conductivity and eddy current losses at high frequencies. Their loss tangent is not very low at such frequencies, and magnetic losses will dominate in most of the cases. Other materials, such as Ferroxplana can be used at high frequencies up to 1 GHz or more.

The magnetically loaded lines have similar transmission characteristics with all other types of loaded lines. Namely, they have lower attenuation than standard lines, low dispersion and higher but constant and ohmic characteristic impedance. The latter implies that a very wide range of characteristic impedance values can be covered by proper inductive loading.

A few common designs are shown in FIGS. 8, 9 and 10. FIG. 8 shows a strip line consisting of a ground and upper conductor 81, an insulator 82, and a layer of magnetic material 83 which provides the inductance.

FIG. 9 shows a similar arrangement but with the magnetic layer 83 being on both sides of the strip conductor 81.

FIG. 10 shows another application of the magnetically loaded strip line. Two lines I, II on a loaded substrate are coupled or uncoupled depending on the permeability of the magnetic material. A material with a suitable BH-curve, properly biased, can act as a switch connecting (when $H = H_{bias}$ is applied) or disconnecting the two lines. The implications are very many for applications such as breadboard design and microwave integrated circuits. The method can be applied to a variety of complex interconnection patterns depending on the geometry of the embedded magnetic material.

In general, the substrate may be layered, uniformly doped or have any suitable loading geometry.

The magnetic layer may be at variable positions "x" and may have variable thickness "d". The provided inductance depends weakly on the position-x and not very strongly on the thickness-d.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An electrical cable having improved signal transmission characteristics comprising a conductor, an insulative material abutting said conductor and providing shunt capacitance to said conductor, and means for providing inductance along with said capacitance and offsetting shunt capacitance thereby reducing the attenuation of a signal within said cable, and means for providing inductance including particles of low-loss magnetic material distributed in alternately high and low concentrations of particles in longitudinally displaced portions in said insulative material.

2. An electrical cable having improved signal transmission characteristics comprising a conductor, an insulative material abutting said conductor and providing shunt capacitance to said conductor, and means for providing inductance along with said capacitance and offsetting said shunt capacitance thereby reducing the attenuation of signals within said cable, said means for providing inductance further includes particles of low loss magnetic material distributed in alternately high and low concentrations of particles in longitudinally displaced portions in said insulative material wherein said means for providing inductance includes a plurality of discrete annular regions of low loss magnetic material concentric with the conductor.

3. In a twisted pair signal transmission cable in which each cable includes a conductor surrounded by electrical insulation, the insulation providing shunt capacitance with said conductor, a method of improving signal transmission characteristics of said cable comprising the steps of providing low loss magnetic material particles in said insulation, and distributing said low loss magnetic material particles in said insulation thereby providing inductance along with said capacitance and reducing the attenuation of a signal in said cable, said step of distributing said low loss magnetic material providing high and low concentrations of particles longitudinally displaced in said insulation.

* * * * *